United States Patent Office 2,758,110
Patented Aug. 7, 1956

2,758,110

PROCESS OF PREPARING SULFURIC ACID ESTERS OF PARTIALLY DEGRADED ALGINIC ACID

Fritz Lindner, Frankfurt am Main-Hochst, Germany, assignor to Farbwerke Hoechst Aktiengesellschaft vormals Meister Lucius und Bruning, Frankfurt am Main-Hochst, Germany, a German company No Drawing. Application March 27, 1951, Serial No. 217,901

Claims priority, application Germany April 3, 1950

1 Claim. (Cl. 260—209.6)

The present invention relates to substances having a heparin-like effect and to a process of preparing such substances.

Owing to its immediate effect, heparin, as is well known, is far superior to the dicoumarin preparations in the curative treatment of thrombosis and embolism. However, in view of the high manufacturing costs, it cannot be applied on a large scale. Many attempts have, therefore, been made to synthesize substances having a heparin-like effect. From the publications of Bergström ("Naturwissenschaften," vol. 23 (1935), page 706, "Zeitschrift für physiologische Chemie," vol. 238 (1936, page 163); of Chargaff and Bancroff (Journal of Biol. Chemistry, vol. 115 (1936), pages 149 and 155); and of Karrer ("Helv. chim. acta," vol. 26 of 1943, page 1296, and vol. 27 of 1944, page 1422), it is known that the polysulphuric acid esters of polysaccharides, in a similar manner to heparin, are capable of preventing or retarding blood coagulation. Nearly all these products are, however, very toxic, so that they cannot be applied clinically.

Now, I have found that substances of very good blood coagulation-inhibiting effect and of very low toxicity are obtained by partly degrading in a conventional manner (compare Hirst and Jones, "Journal Chem. Soc.," London, 1939, page 1880) alginic acid or the alkali metal salts or alkaline earth metal salts thereof and sulphurising the degradation products thus obtained.

Alginic acid is a polysaccharide which is obtained from various kinds of laminaria and is nowadays prepared industrially on a large scale. According to its chemical structure it must be regarded as a poly-mannuronic acid. It shows rather a high degree of polymerisation and may be degraded by heating in an aqueous suspension to 100° C., if required with the addition of an acid or an acid salt, and still better by a prolonged boiling in methyl alcoholic hydrochloric acid.

The alginic acid thus partially degraded may be sulphurised according to various methods, for instance by treatment with concentrated sulphuric acid or sulphuric acid monohydrate or fuming sulphuric acid of various strengths, at a low temperature, or, still better, with chlorsulphonic acid in pyridine or the homologues thereof, such as collidine, at a raised temperature, the best results being attained at a temperature of about 100° C.

Whereas according to the afore-mentioned publications the preparation of the poly-sulphuric acid esters of polysaccharides was performed in rather a complicated way and, especially for the purification, dialysis was necessary, pure sulphuric acid esters of partially degraded alginates may be obtained by pouring directly into methanol the clarified sulphurisation solution prepared by the method characterised by the use of chlorsulphonic acid and pyridine or the homologues thereof. In the precipitation, the amine salt, for instance the pyridine salt or the collidine salt of the sulphuric acid ester, is deposited in the pure form and it may be transformed into the corresponding alkali metal salt by dissolving it in aqueous alkali, for instance in sodium carbonate solution, caustic soda solution or caustic potash solution, the reaction being just alkaline to phenolphthalein, and precipitating it with water-soluble organic solvents, such as low aliphatic alcohols or ketones, for instance acetone, methanol or ethanol.

The alkali metal, especially sodium, salts of the sulphuric acid esters of the partially degraded alginic acid thus obtained are stable in aqueous solution and may be applied as remedies either intravenously or intramuscularly as depot-preparations, if required in gelatine solution or in solutions of polymers, such as polyvinyl alcohols, polyvinyl pyrrolidone or the like.

The following example illustrates the invention:

50 grams of sodium alginate are suspended in 400 cc. of methyl alcoholic hydrochloric acid of 10 per cent. strength and the suspension is heated to boiling for 17 hours under a reflux condenser. Then it is filtered off, washed with methanol and ether and dried. About 25 grams of a white substance are obtained which is finely pulverised. $[\alpha]_D^{20°} = -134°$ (c, 1.6 in neutral solution).

100 cc. of dry pyridine are cooled in a freezing mixture and 24 cc. of chlorsulphonic acid are added, drop by drop, while stirring. 10 grams of the degradation product described above are then introduced and the mixture is heated for 5 hours to 100° C. in an oil bath.

The whole is allowed to stand for one night at room temperature and the viscous solution, which is of a brown colouration, is then clarified by centrifuging.

The clear solution is poured into 500 cc. of methanol, stirred for half an hour and the precipitation product is centrifuged, washed with methanol and ether and dried. The yield amounts to about 15 grams.

The product is dissolved in a small quantity of water, rendered alkaline to phenolphthalein by means of caustic soda solution, centrifuged until it is clear and precipitated with several times the volume of methanol. The precipitated product is centrifuged, washed with methanol and ether and dried.

A white powder is obtained which dissolves in water to a clear solution and which is distinguished by a very low toxicity and at the same time by a very high capacity for inhibiting blood coagulation.

I claim:

A process of preparing sulfuric acid esters of partially degraded alginic acid by partial degradation of a member selected from the group consisting of alginic acid, alkali alginates and alkaline earth alginates by prolonged boiling in methyl alcoholic hydrochloric acid and transformation of the degradation product by sulfation into a sulfuric acid ester, wherein the sulfation is carried out with chlorsulfonic acid in pyridine, whereupon the reaction solution is clarified and the pyridine salt of the sulfuric acid ester is separated by precipitation with methanol and transformed into an alkali metal salt by dissolving it in an alkaline solution, the reaction being just alkaline to phenolphthalein, and precipitating it with an organic solvent miscible with water.

References Cited in the file of this patent

UNITED STATES PATENTS

| | | |
|---|---|---|
| 2,508,433 | Snyder | May 23, 1950 |
| 2,612,498 | Alburn | Sept. 30, 1952 |